United States Patent

[11] 3,543,898

[72] Inventor Harry Zoltok
 Winnipeg, Manitoba, Canada
[21] Appl. No. 838,260
[22] Filed July 1, 1969
[45] Patented Dec. 1, 1970
[73] Assignee Motor Coach Industries Ltd.
 Winnipeg, Manitoba, Canada

[54] REMOTE CLUTCH ADJUSTMENT DEVICE
 7 Claims, 4 Drawing Figs.
[52] U.S. Cl..................................................... 192/99,
 192/111, 192/91
[51] Int. Cl......................................................... F16d 13/75
[50] Field of Search........................................... 192/99,
 995, 111

[56] References Cited
UNITED STATES PATENTS
2,025,854 12/1935 Freeman ..................... 192/99S-X
3,430,745 3/1969 Randol......................... 192/99S-X
FOREIGN PATENTS
625,422 6/1949 Great Britain................ 192/111

Primary Examiner—Benjamin W. Wyche
Attorney—Kent and Ade

ABSTRACT: A lever is splined to the clutch operating shaft and is adjustable with relation to a clutch assist lever by means of a left and right handed screw engageable between said lever and rotated from the rear of the vehicle through rods, universal joints, and a worm and pinion gear connected to said screw thus permitting adjustment of the clearance between the clutch thrust race and the operating fingers.

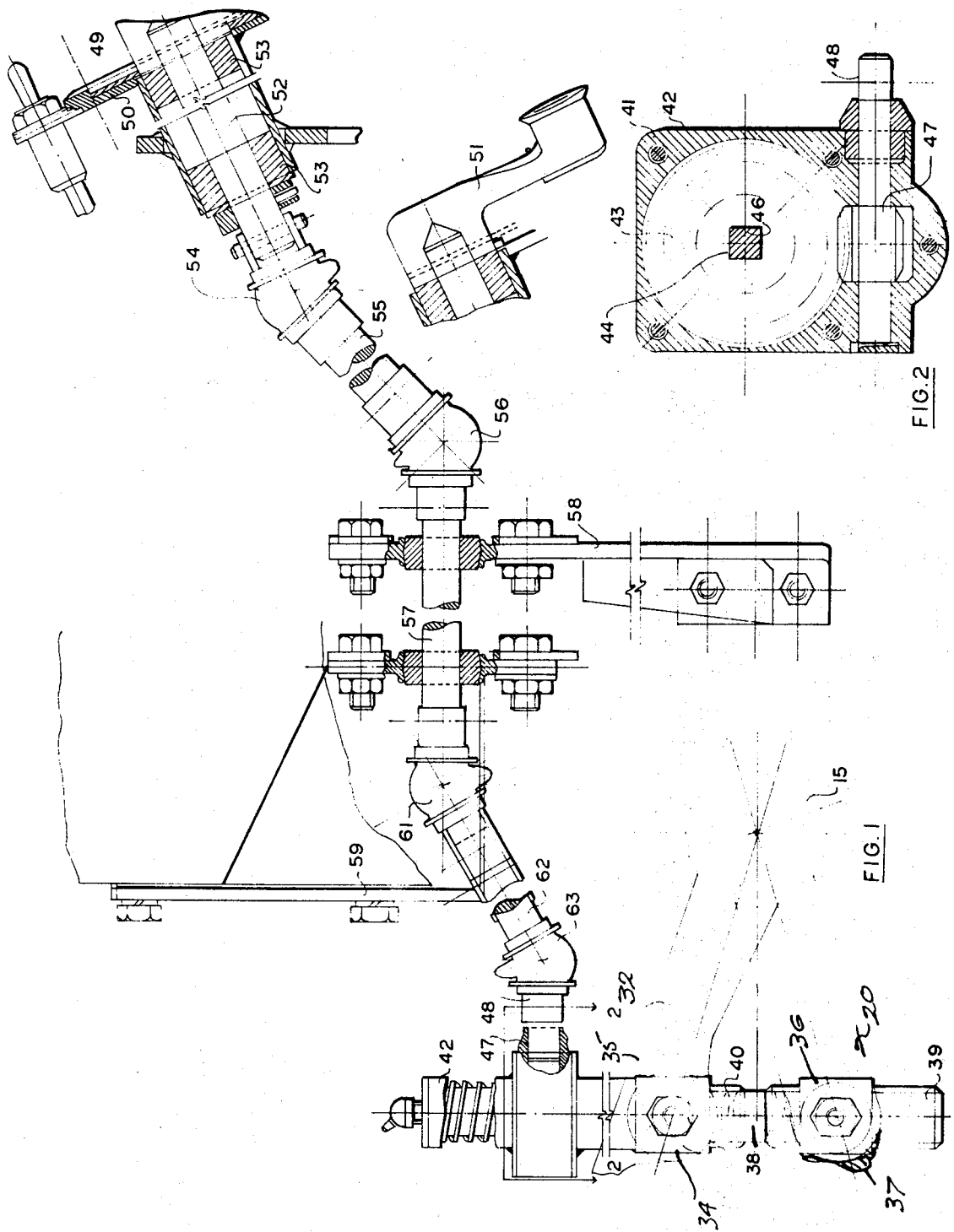

REMOTE CLUTCH ADJUSTMENT DEVICE

This invention relates to new and useful improvements in means to adjust the clearance between the clutch operating fingers and the operating thrust race.

It is well known that as the clutch plates wear, this clearance gradually decreases and, if adjustment is not provided, the thrust race can effectively prevent the clutch plates from engaging properly thus causing slippage. In heavy duty motorcoaches and the like, there is provision for approximately 1 inch of wear in lineal movement and it is desirable that the clearance between the fingers and the thrust race be maintained at a fairly constant amount, this clearance, of course, being noticeable at the clutch pedal by the operator.

Due to the heavy duty aspect of such clutches, this clearance needs continual adjustment during the life of the plates and it is usually relatively difficult to make this adjustment due to the inaccessibility of the clutch and adjusting means.

I have overcome these disadvantages firstly by providing a novel linkage which enables the adjustment to be made without wrenches being required and secondly by the provision of a crank at the rear of the vehicle in an accessible location and which is operatively connected to this linkage thus enabling the mechanic to adjust this clearance at will even when the vehicle is in use.

The principle object and essence of the invention therefore is to provide a device of the character herewithin described which enables the clearance between the clutch operating fingers and the thrust race to be adjusted remotely by the operator.

Another object of the invention is to provide a device of the character herewithin described which enables the adjustment to be made without interfering with the operation of the clutch and without the necessity of undoing lock nuts and shortening or lengthening rods or the like.

A yet further object of the invention is to provide a device of the character herewithin described in which the clutch may be adjusted by the operator who is usually situated close to 4 ft. from the clutch.

In summary, the invention teaches the use of a plurality of rods or shafts and universal joints operated by a crank at the mechanic's position and being connected to a worm and pinion device which in turn is connected to a left and right hand screw threaded rod screw threadably engaging the nuts on two levers, the angle between which controls the clearance between the fingers and the thrust race.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying FIGS. in which:

FIG. 1 is a side elevation of the operating portion of the adjustment.

FIG. 2 is a section of the worm and pinion device substantially along the line 2–2 of FIG. 1.

In the drawings like characters of reference indicate corresponding parts in the different FIGS.

Figure 3:
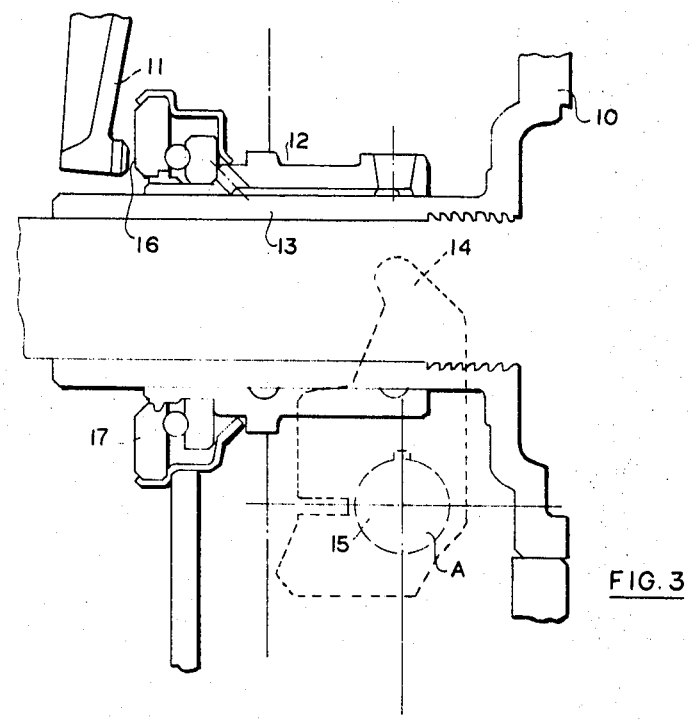
FIG. 3 is a fragmentary partially sectioned portion of a conventional clutch showing the relationship between the thrust race, the fingers and the operating shaft.

Proceeding therefore to describe the invention in detail, reference should first be made to FIG. 3 in which 10 illustrates the front cover, 11 one end of one of the operating fingers and 12 which is a bearing carrier carrying a bearing member and which rotates with the flywheel (not illustrated) when engaged. The bearing carrier 12 moves endwise along the portion 13 of the front cover 10, by means of a fork, one end 14 of which is shown in phantom. This fork is keyed or otherwise secured to the clutch operating shaft 15 which is partially rotatable, the ends of the fork 14 bearing against the thrust race and moving same endwise against the fingers 11.

Reference character 16 shows the desired clearance between the ends of the fingers and the thrust race facing 17 and it is this clearance which is adjustable as will hereinafter be described.

Figure 4:
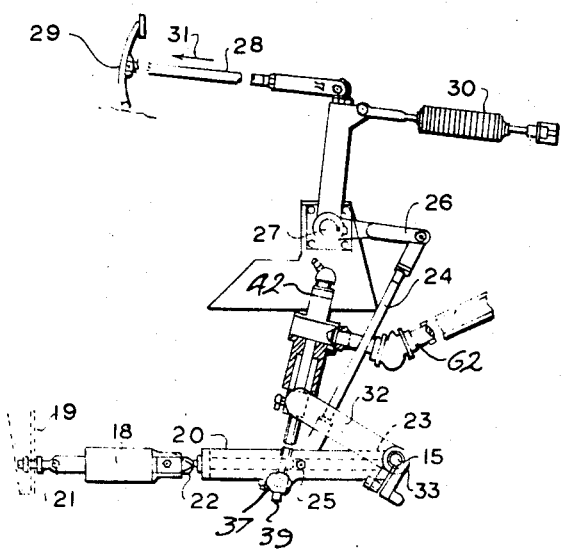
FIG. 4 is a side elevation of the linkage between the clutch pedal and the clutch operating shaft.

FIG. 4 shows an air operated piston and cylinder assembly 18 extending between a fixed point 19 and a first lever 20, being pivotally connected at 21 and 22. A source of compressed air is available to this piston and cylinder assembly but as this is conventional, it has not been shown in the accompanying drawings.

This first lever 20 is provided with a boss (not illustrated) at the end 23 thereof by which the lever is freely engaged around shaft 15. By this is meant that the shaft 15 can rotate within this boss.

A link 24 extends from a point 25 intermediate the ends of lever 20 and a bell crank 26 mounted upon shaft 27. This in turn is connected by further linkage 28, to a conventional clutch operating pedal 29 which is situated within the driver's position in the vehicle. A heavy duty return spring 30 normally maintains the linkage in the position shown in FIG. 4 but movement of the pedal 29 in the direction of arrow 31, moves the linkage against pressure of spring 30 thus moving the first lever 20 upwardly and enabling the piston and cylinder assembly 18 to assist in the operation of the clutch mechanism.

A second lever 32 is secured as by a spline or the like by end 33 to shaft 15. This lever extends at an acute angle upwardly with relation to lever 20 and is provided with a screw threaded nut 34 upon the other end 35 thereof.

A further screw threaded nut 36 is secured to a point 37 intermediate the ends of lever 20 and both of these nuts 34 and 36 are oppositely screw threaded.

A shaft 38 is provided with screw threads on one end 39 corresponding to the screw threads within nut 36 and opposite screw threads on the portion 40 corresponding to the screw threads within nut 34, it being understood that these screw threaded portions of the shaft 38 engage within the nuts 34 and 36 as clearly shown in FIG. 1. It will therefore be observed that rotation of shaft 38 in one direction will cause the nuts 34 and 36 to move towards one another thus decreasing the angle between the first and second levers 20 and 32 and that rotation of the shaft 38 in the opposite direction will cause the nuts to move apart or away from one another thus increasing the angle between the first and second levers 20 and 32.

Inasmuch as lever 20 is free to rotate on shaft 15, movement of the nuts towards or away from one another will cause lever 32 to rotate shaft 15 in one direction or the other thus increasing or decreasing the clearance 16 between the fingers 11 and the thrust race face 17.

Means are provided to operate this adjustment and take the form of a gear box 41. This gear box consists of a casing 42 having a pinion 43 journalled for rotation thereon with a square aperture 44 in the center thereof within which fits the upper end 46 of the shaft 38 which is square to engage within this aperture.

Engageable with the pinion 43 and also journalled for rotation within the casing 42 is a worm gear 47 with the shaft 48 extending outwardly from the side of the casing 42.

Referring back to FIG. 1, reference character 49 illustrates generally the mechanics or accessible location and 50 a support plate or fascia board within this area.

A crank is secured to a shaft 52 which in turn is journalled within bearings 53 mounted upon the rear side of the support 50.

The shaft 52 is connected via a universal joint assembly 54 to a second shaft 55 and thence to a second universal joint 56. A third shaft 57 extends horizontally between support plates 58 and 59 and is connected to a further shaft 60 by means of a further universal joint 61.

Shaft 62 in turn connects to the worm shaft 48 by means of a further universal joint 63.

The average distance in motor coaches and the like between the crank 51 and the worm shaft 48 is as much as 4 ft. but the mechanism or linkage hereinbefore described enables crank 51 to rotate shaft 38 thus adjusting the clearance as desired.

Various modifications can be made within the scope of the inventive concept which is herein disclosed and/or claimed. Accordingly, it is intended that what is set forth should be regarded as illustrative of such concept and not for the purpose of limiting protection to any particular embodiment thereof, and that only such limitations should be placed upon the scope of protection to which the inventor hereof is entitled as justice dictates.

I claim:

1. In a clutch operating assembly which includes a plurality of plate engaging fingers, and endwise shiftable thrust race for engaging said fingers, a shaft partially rotatable to move said thrust race endwise, an air piston and cylinder assembly operatively connected to said shaft for assisting said partial rotation thereof and a foot pedal for operating the clutch assembly; a first lever extending between said piston and cylinder assembly and said shaft and freely mounted by one end thereof on said shaft, a second lever secured by one end thereof to said shaft for rotating same, and extending at an acute angle with respect to said first lever, operatively connecting means extending between the other end of said second lever and a point intermediate the ends of said first lever, link means extending from a point intermediate the ends of said first lever and the associated clutch foot pedal, and means to adjust, within limits, the relative angle between said first and second levers.

2. The device according to claim 1 in which said means to adjust the relative angle between said first and second lever includes a nut on said other end of said second lever, a further nut at said point intermediate the ends of said first lever, the threads on said nuts being oppositely handed and a shaft having opposite handed threads on each end thereof and being screw threadably engageable with said nuts whereby rotation of said shaft in one direction moves said nuts apart and hence increases the angle between said first and second levers, and rotation of said shaft in the opposite direction moves said nuts together and hence decreases the angle between said first and second levers.

3. The device according to claim 2 in which said nuts are pivotally secured to said levers.

4. The device according to claim 2 in which said means to adjust the relative angle between said first and second levers also includes means to rotate said screw threaded shaft, said means including a worm and pinion gear box operatively connected to one end of said screw threaded shaft and further means remotely connected between a remote position and said gear box for rotating said worm.

5. The device according to claim 3 in which said means to adjust the relative angle between said first and second levers also includes means to rotate said screw threaded shaft, said means including a worm and pinion gear box operatively connected to one end of said screw threaded shaft and further means remotely connected between a remote position and said gear box for rotating said worm.

6. The device according to claim 4 in which said means remotely connected between a remote position and said gear box includes a crank mounted for rotation on said supporting surface at said remote position, and a plurality of shafts and universal joints operatively extending between said crank and said worm.

7. The device according to claim 5 in which said means remotely connected between a remote position and said gear box includes a crank mounted for rotation on said supporting surface at said remote position, and a plurality of shafts and universal joints operatively extending between said crank and said worm.